United States Patent
Dupuis et al.

(10) Patent No.: US 9,923,643 B2
(45) Date of Patent: Mar. 20, 2018

(54) TECHNIQUES FOR REDUCED JITTER IN DIGITAL ISOLATORS

(71) Applicant: Silicon Laboratories Inc., Austin, TX (US)

(72) Inventors: Timothy J. Dupuis, Austin, TX (US); Jeffrey L. Sonntag, Austin, TX (US); Michael J. Mills, Austin, TX (US); Riad Wahby, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 447 days.

(21) Appl. No.: 14/105,332

(22) Filed: Dec. 13, 2013

(65) Prior Publication Data

US 2015/0171901 A1   Jun. 18, 2015

(51) Int. Cl.
*H04L 27/00* (2006.01)
*H04B 10/80* (2013.01)

(52) U.S. Cl.
CPC .................................. *H04B 10/802* (2013.01)

(58) Field of Classification Search
CPC .................................................. H04B 1/0483
USPC ....... 375/295, 316, 357, 359, 360, 364, 373, 375/376; 327/119, 176, 269, 262, 427, 327/540
See application file for complete search history.

(56) References Cited

U.S. PATENT DOCUMENTS

| | | | |
|---|---|---|---|
| 7,688,869 B2 * | 3/2010 | Adam et al. | 370/537 |
| 2008/0136383 A1 * | 6/2008 | Hasegawa et al. | 323/271 |
| 2008/0205564 A1 * | 8/2008 | Sugawara et al. | 375/354 |
| 2013/0278438 A1 * | 10/2013 | Mueck | 340/870.16 |
| 2014/0169038 A1 * | 6/2014 | Kamath et al. | 363/16 |
| 2014/0266373 A1 * | 9/2014 | Goswami et al. | 327/262 |

OTHER PUBLICATIONS

Silicon Laboratories Inc., "Low-Power, Single and Dual-Channel Digital Isolators," Si8410/20/21 / Si8422/23, Rev. 1.2 3/12, 2012, 38 pages.

* cited by examiner

*Primary Examiner* — Dhaval Patel
(74) *Attorney, Agent, or Firm* — Zagorin Cave LLP (57) ABSTRACT

An apparatus for communicating using an isolation channel includes a transmitter circuit having a first terminal configured to communicate a first signal. The first signal oscillates in response to a data signal having a first signal level and is constant in response to the data signal having a second signal level. The transmitter circuit includes a second terminal configured to communicate that oscillates in response to the data signal having the second signal level and is constant in response to the data signal having the first signal level. The apparatus may include a receiver circuit configured to generate a recovered data signal having a first transition in a first direction between first and second levels based on an edge of a first received signal and having a second transition in a second direction between the first and second levels based on an edge of a second received signal.

19 Claims, 6 Drawing Sheets

TECHNIQUES FOR REDUCED JITTER IN DIGITAL ISOLATORS

BACKGROUND

Field of the Invention

The invention relates to isolation technology and more particularly to communication across an isolation channel.

Description of the Related Art

In a typical control application, a processor system provides one or more control signals for controlling a load system. During normal operation, a large DC or transient voltage difference may exist between the domain of the processor system and the domain of the load system, thus requiring an isolation barrier between the processor system and the load system. For example, one domain may be "grounded" at a voltage which is switching with respect to earth ground by hundreds or thousands of volts. Accordingly, an intermediate system includes isolation that prevents damaging currents from flowing between the processor system and the load system. Although the isolation prevents the processor system from being coupled to the load by a direct conduction path, an isolation channel allows communication between the two systems using optical (opto-isolators), capacitive, inductive (transformers), or electromagnetic techniques.

In general, on-off keying (OOK) is a form of amplitude-shift keying modulation that represents digital data as the presence or absence of a carrier wave or oscillating signal. The presence of the carrier for a particular duration represents a binary one, while its absence for the same duration represents a binary zero. This type of signaling is robust for isolation in driver applications because a logic '0' state sends the same signal (e.g., nothing) as when the primary side loses power and the device gracefully assumes its default state. That behavior is advantageous in driver applications because it will not accidentally turn on a device being driven, even when the primary side loses power. However, a typical isolator receives the digital signal from the processor system asynchronous to a clock internal to the isolator system. Thus, this technique may introduce a substantial amount of jitter into the driver control signal. Accordingly, improved techniques for communicating across an isolation channel are desired.

SUMMARY OF EMBODIMENTS OF THE INVENTION

Various embodiments of an isolator system having reduced jitter are disclosed. In at least one embodiment of the invention, an apparatus for communicating using an isolation channel includes a transmitter circuit. The transmitter circuit includes a first terminal configured to communicate a first signal. The first signal oscillates in response to a data signal having a first signal level and the first signal is constant in response to the data signal having a second signal level. The transmitter circuit includes a second terminal configured to communicate a second signal. The second signal oscillates in response to the data signal having the second signal level. The second signal is constant in response to the data signal having the first signal level. The transmitter circuit may include a first signal generator configured to receive the data signal as an enable signal, enable a first oscillator in response to the first signal level of the data signal, and disable the first oscillator in response to the second signal level of the data signal to thereby generate the first signal. The transmitter circuit may include a second signal generator configured to receive the data signal as a complementary enable signal, enable a second oscillator in response to the second signal level of the data signal, and disable the second oscillator in response to the first signal level of the data signal to thereby generate the second signal. The transmitter circuit may be configured to transmit the first signal using the first terminal and configured to transmit the second signal using the second terminal. The first signal may oscillate for a duration of the data signal having the first signal level. The second signal may oscillate for a duration of the data signal having the second signal level. The second signal may oscillate for a duration of a pulse indicating the data signal having the second signal level, the pulse having a duration less than a duration of the data signal having the second signal level. The first signal generator may include a first oscillator circuit. The second signal generator may include a one-shot signal generator configured to generate a pulse in response to the data signal transitioning from the first value to the second value. The second signal generator may include a second oscillator circuit configured to generate a pulse of the clock signal in response to the pulse. The apparatus may include a receiver circuit configured to generate a first received signal based on a received representation of the first signal and configured to generate a second received signal based on a received representation of the second signal. The receiver circuit may include a combiner circuit configured to generate a recovered data signal having a first transition in a first direction between the first and second levels based on an edge of the first received signal and having a second transition in a second direction between the first and second levels based on an edge of the second received signal.

In at least one embodiment of the invention, a method of communicating using an isolation channel includes generating a first signal. The first signal oscillates in response to a data signal having a first signal level. The first signal is constant in response to the data signal having a second signal level. The method includes generating a second signal indicative of the data signal having a second signal level. The second signal oscillates in response to the data signal having the second signal level. The second signal is constant in response to the data signal having the first signal level. Generating the first signal may include enabling a first oscillator for a duration of the data signal having the first signal level. Generating the second signal may include enabling a second oscillator for a duration of the data signal having the second signal level. Generating the second signal may include generating a pulse indicating the data signal having the second signal level and enabling a second oscillator for a duration of the pulse. The method may include generating a recovered data signal having a first transition in a first direction between the first and second levels based on an edge of the first received signal and having a second transition in a second direction between the first and second levels based on an edge of the second received signal. The recovered data signal may be DC correct.

In at least one embodiment of the invention, an apparatus for communicating using an isolation channel includes a receiver circuit including a first terminal configured to receive from an isolation channel a representation of a first signal. The representation of the first signal oscillates in response to a data signal having a first signal level. The representation of the first signal is constant in response to the data signal having a second signal level. The receiver includes a second terminal configured to receive from the isolation channel a representation of a second signal. The representation of the second signal oscillates in response to the data signal having the second signal level and the representation of the second signal is constant in response to the data signal having the first signal level. The receiver circuit may be configured to generate a first received signal based on the representation of the first signal received from the first terminal. The receiver circuit may be configured to generate a second received signal based on the representation of the second signal received from the second terminal. The receiver circuit may include a combiner circuit configured to generate a recovered data signal having a first transition in a first direction between the first and second levels based on an edge of the first received signal and having a second transition in a second direction between the first and second levels based on an edge of the second received signal. The recovered data signal may be DC correct.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
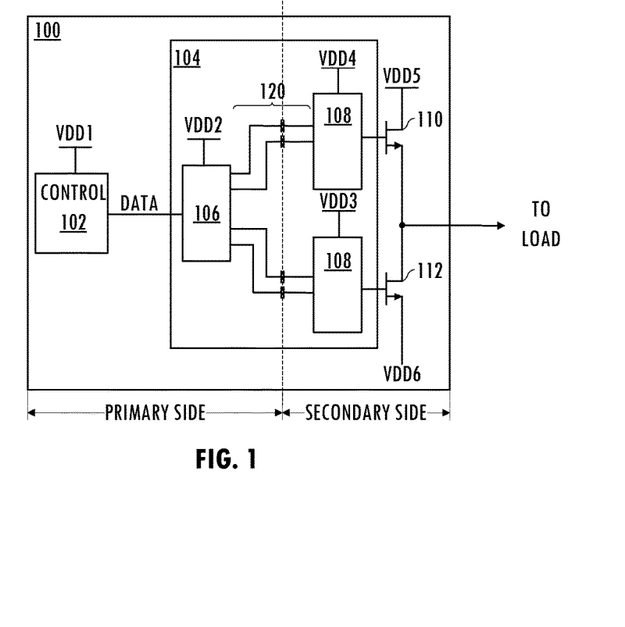
FIG. 1 illustrates a functional block diagram of an exemplary digital isolator system.

Referring to FIG. 1, in an exemplary application, controller 102, which may be a microprocessor, microcontroller, or other suitable processing device, operates in a first domain (i.e., a domain including VDD1, e.g., 5 Volts (V)) and provides one or more signals (e.g., DATA) for a high power load system operating in a second domain (i.e., a domain including VDD5 and VDD6, e.g., 150V and −150V, respectively, for an exemplary class D audio application) using digital isolator 104. Digital isolator 104 includes isolation channel 120, which may isolate the domains on a first side of system 100, e.g., the primary side including VDD1 (e.g., less than ten volts) and VDD2 (e.g., less than ten volts) and devices coupled thereto, and a second side of system 100, e.g., the secondary side including VDD3 and VDD4 (e.g., tens of volts) and VDD5 and VDD6 (e.g., hundreds of volts) and devices coupled thereto. In the exemplary class D audio application, the voltage VDD3-$V_{S112}$ is equal to a constant voltage (e.g., 10V-30V) and the voltage VDD4-$V_{S110}$ is equal to a constant voltage (e.g. 10V-30V), where $V_{S110}$ and $V_{S112}$ are the voltage on the source node of device 110 and the voltage on the source node of device 112, respectively.

Isolation channel 120 facilitates safe communication of a signal received from controller 102 in the primary side to the secondary side. The secondary side includes driver circuitry (e.g., included in receiver circuits 108), which generates an output control signal based on the signal received from the primary side and provides a suitable drive signal to devices 110 and 112. In an exemplary embodiment, digital isolator 104 includes multiple integrated circuits configured as a multi-chip module in a single package. For example, digital isolator 104 includes a primary side integrated circuit (e.g., transmitter circuit 106) and a secondary side integrated circuit (e.g., receiver circuits 108). However, other embodiments of digital isolator 104 include one receiver circuit 108 or additional transmitter circuits 106 and/or additional receiver circuits 108. Transmitter circuit 106 and receiver circuit 108 include terminals that may be pins of corresponding packages included in a package of the multi-chip module. Those terminals may be coupled to external elements, e.g., transformers, discrete resistors, and discrete capacitors within the multi-chip module or to terminals of the package of the multi-chip module, and a package of controller 102. In other embodiments, transmitter circuit 106 is formed on a first integrated circuit die and receiver circuit 108 is formed on another integrated circuit die, both of which are attached to a lead frame and include terminals coupled to isolation channel 120 formed on the lead frame and packaged as a single device. In still other embodiments, transmitter circuit 106 and receiver circuit 108 include terminals coupled to isolation channel 120, all of which are formed on an integrated circuit die. Isolation channel 120 allows safe communication of signals from controller 102 to receiver circuits 108, which drive high-power drive devices 110 and 112 used to deliver power to a load system. Exemplary high-power drive devices include power metal-oxide-semiconductor field-effect transistors (MOSFETs), insulated-gate bipolar transistors (IGBTs), Gallium-Nitride (GaN) MOSFETs, Silicon-Carbide power MOSFETs, and other suitable devices able to deliver high power signals.

Figure 2:
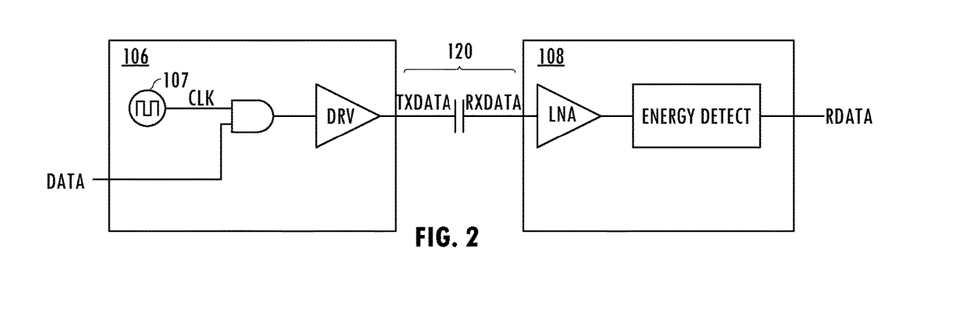
FIG. 2 illustrates a functional block diagram of an exemplary digital isolator system.
Figure 3:
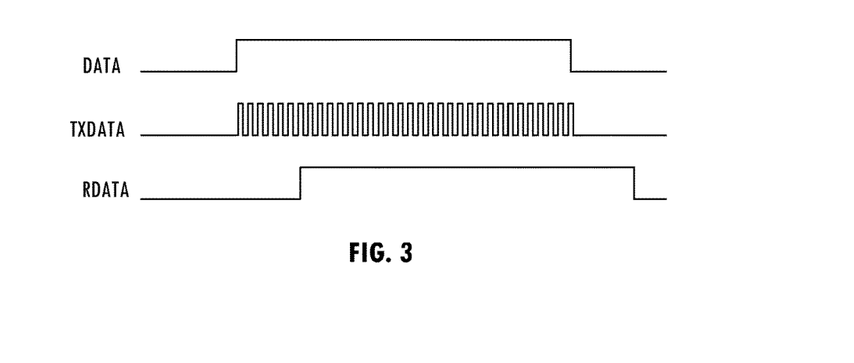
FIG. 3 illustrates waveforms for the digital isolator system of FIG. 2.

In at least one embodiment of system 100, isolation channel 120 blocks DC signals and only passes AC signals. Isolation channel 120 is illustrated as including capacitive isolation, although other suitable isolation techniques may be used. Isolation channel 120 uses on-off keying to communicate one or more digital signals (e.g., DATA) between transmitter circuit 106 and receiver circuit 108. Transmitter circuit 106 receives DATA asynchronously to an internal clock and generates an on-off keying representation of the digital signal of DATA by providing a signal that oscillates when DATA has a first value (e.g., a high value, i.e., a signal level indicating a digital '1') and is constant when DATA has a second value (e.g., a low value, i.e., a signal level indicating a digital '0'). Referring to FIGS. 2 and 3, a typical technique generates that representation of DATA using a logical AND of the carrier clock signal, CLK, with DATA. Carrier clock 107 has a frequency much greater than a frequency associated with the DATA. By driving a differential signal representing DATA on a capacitively coupled conductor of isolation channel 120, a representation of DATA is received by receiver circuit 108, which may amplify that representation using a low-noise amplifier and detect the digital data of that received representation using energy detection or other suitable technique. Receiver circuit 108 generates a recovered digital signal, RDATA, which is a recovered version of DATA. The recovered digital signal, RDATA, may exhibit jitter that is approximately $T_{CLK}/2$ since DATA can arrive at transmitter circuit 106 at any time during the period $T_{CLK}$ of clock 107. One technique for reducing the jitter on RDATA includes increasing the frequency of clock 107. However, increasing the carrier frequency increases power consumption of the system, which may be undesirable in some applications.

Figure 4:
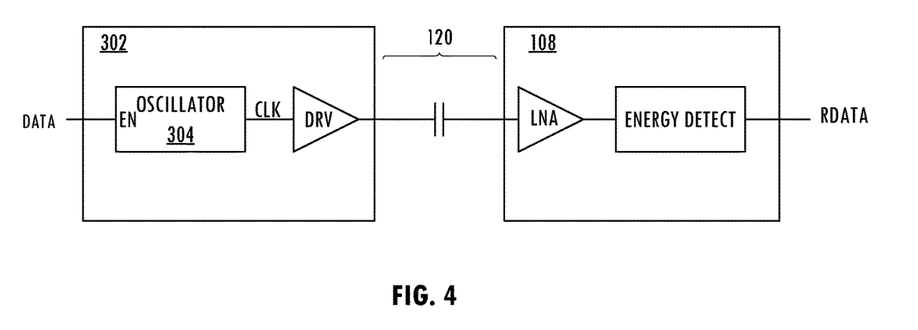
FIG. 4 illustrates a functional block diagram of a low-jitter digital isolator system.
Figure 5:
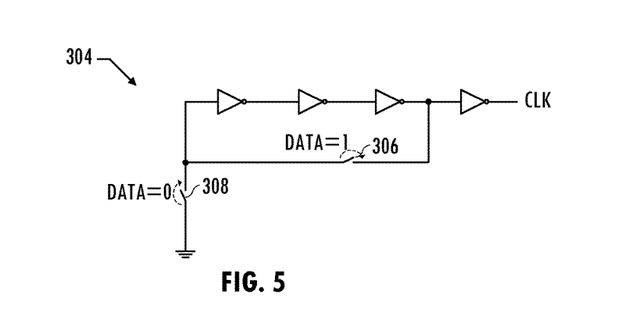
FIG. 5 illustrates a circuit diagram of an exemplary oscillator of the low-jitter digital isolator system of FIG. 4.
Figure 6:
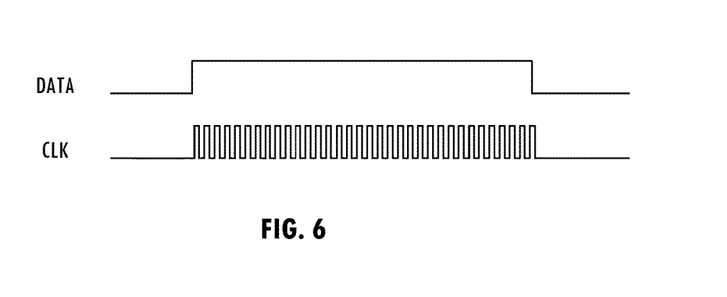
FIG. 6 illustrates waveforms for the low-jitter digital isolator system of FIG. 4.

Referring to FIGS. 4-6, in at least one embodiment of a digital isolator system, a primary side device generates a representation of a data signal to be communicated over an isolation channel improving an edge (i.e., reducing the jitter associated with a data transition) by starting and stopping the oscillator 304 using DATA as the enabling signal. For example, oscillator 304 is a ring oscillator that includes switches 306 and 308. Switch 306 is closed when DATA has a high value (i.e., DATA='1') and is open otherwise. Switch 308 is closed when DATA has a low value (i.e., DATA='0') and is open otherwise. The resulting signal, CLK, is used as the representation of DATA that is transmitted across isolation channel 120. This technique makes the rising transition of RDATA independent of the frequency of oscillator 304 and reduces jitter on the rising edge of RDATA. However, this technique does not improve the falling edge of RDATA, since DATA, which is asynchronous to CLK, may still transition to zero at any time during a period of the oscillating signal. Note that other controllable oscillator type may be used.

Referring to FIGS. 7-10, in at least one embodiment of a digital isolator system, jitter is reduced on both the rising and falling edges of RDATA using expanded isolation channel 606 that includes a channel for communicating a representation of DATA indicative of DATA having a high value (e.g. signal DATA_ONE) and an additional channel for communicating a representation of DATA indicative of DATA having a low value (e.g., signal DATA_ZERO). Signal DATA_ONE oscillates in response to DATA having a high value and is constant otherwise, and signal DATA_ZERO oscillates in response to DATA having a low value and is constant otherwise. Transmitter circuit 602 generates the DATA_ONE and DATA_ZERO signals using oscillators 610, which receive complementary versions of DATA as enable signals. Circuits 612, which may include driver circuits, transmit DATA_ONE and DATA_ZERO to expanded isolation channel 606.

Figure 7:
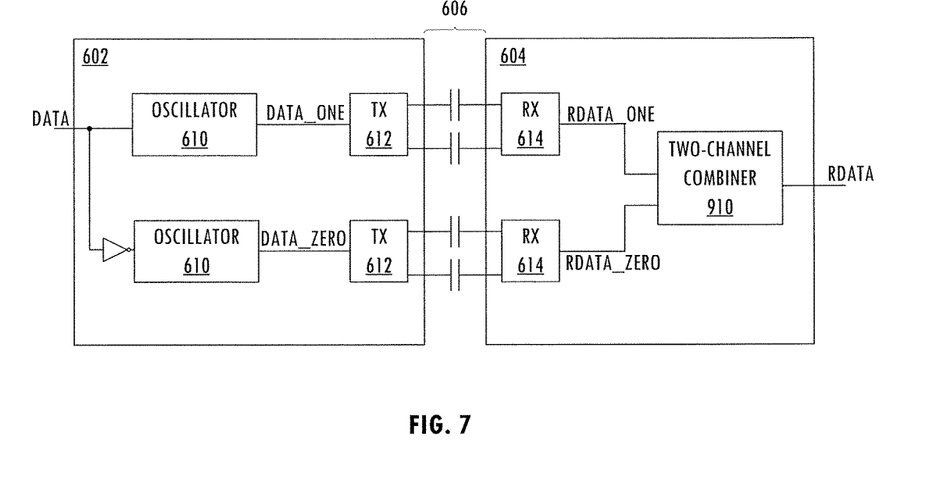
FIG. 7 illustrates a functional block diagram of a low-jitter digital isolator system consistent with at least one embodiment of the invention.
Figure 8:
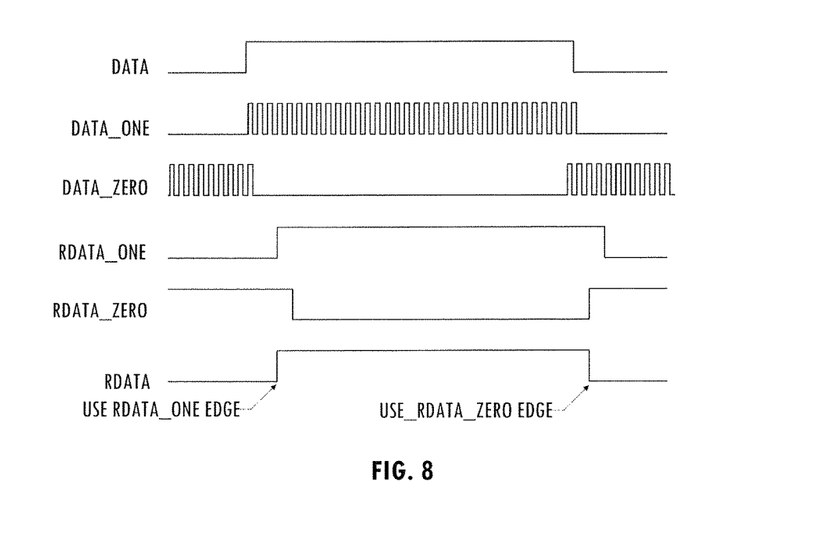
FIG. 8 illustrates waveforms for the low-jitter digital isolator system of FIG. 7.

Circuits 614 of receiver circuit 604 include low-noise amplifiers, energy detectors, and other suitable receiver circuitry to receive two differential signals based on DATA_ONE and DATA_ZERO and generate RDATA_ONE and RDATA_ZERO based on those received differential signals. Combiner 910 combines RDATA_ONE and RDATA_ZERO to generate RDATA, which is a recovered version of DATA.

Figure 9:
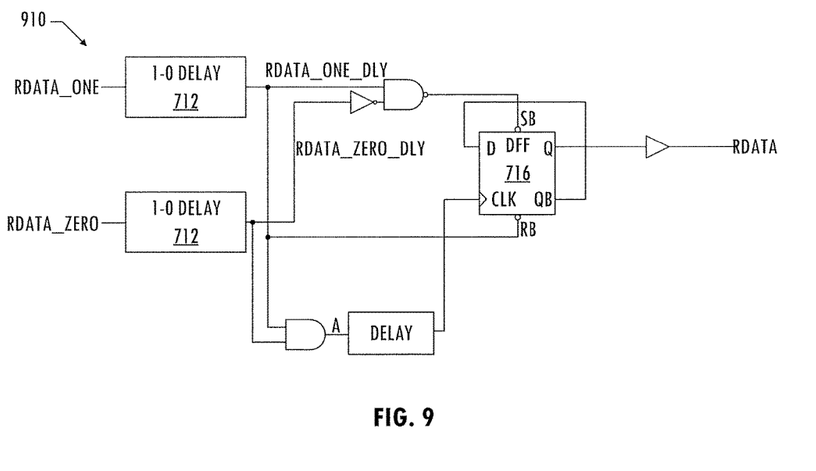
FIG. 9 illustrates a functional block diagram of a combiner of the low-jitter digital isolator system of FIG. 7 consistent with at least one embodiment of the invention.

Combiner 910 generates RDATA by generating a first transition of RDATA (e.g., rising edge) using a transition of RDATA_ONE (e.g., rising edge) and generating a second transition of RDATA (e.g., falling edge) using a transition of RDATA_ZERO (e.g., rising edge). Those transitions of RDATA_ONE and RDATA_ZERO are independent of the frequency of oscillators 610.

Figure 10:
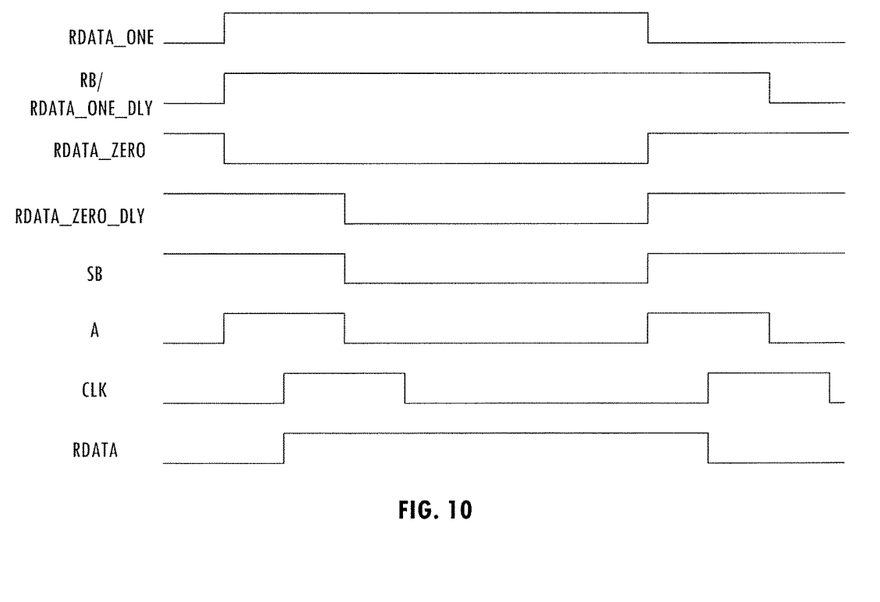
FIG. 10 illustrates waveforms for combiner of FIG. 9 consistent with at least one embodiment of the invention.
Figure 11:
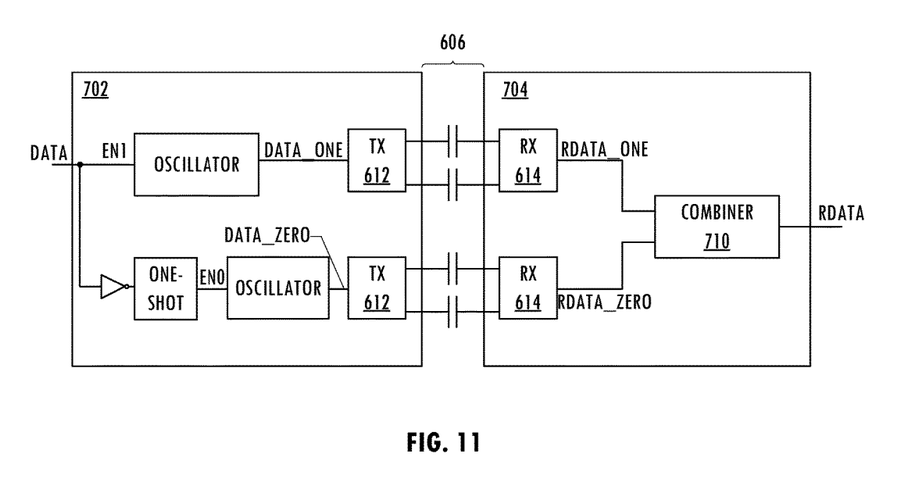
FIG. 11 illustrates a functional block diagram of a low-jitter digital isolator system consistent with at least one embodiment of the invention.
Figure 12:
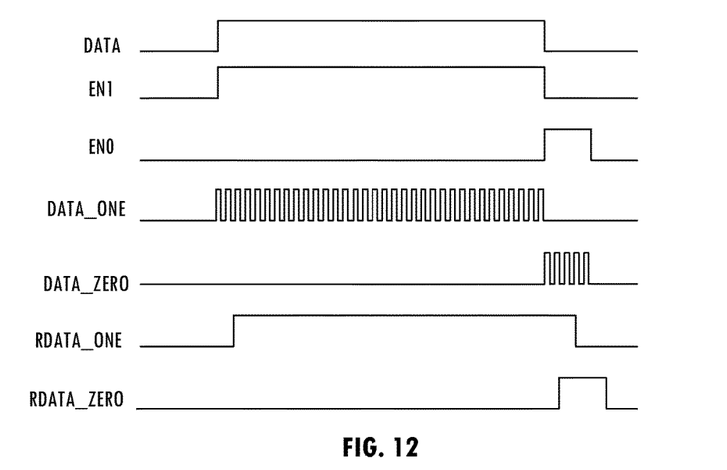
FIG. 12 illustrates waveforms for the low-jitter digital isolator system of FIG. 10.

Referring to FIGS. 9 and 10, an exemplary combiner 910 includes D-type flip-flop 716 that receives a clock signal, CLK, which is based on delayed versions of RDATA_ONE and RDATA_ZERO. Falling edge delay elements 712 delay only the falling edges of an input signal (e.g., RDATA_ONE or RDATA_ZERO) while the rising edge remains substantially unchanged. The clock signal is high only when RDATA_ONE_DLY and RDATA_ZERO_DLY are both high, which occurs in response to transitions of DATA. That state is caused by the delay of the falling edge of RDATA_ZERO_DLY and the substantially unchanged rising edge of RDATA_ONE_DLY in response to a rising edge of DATA and by the substantially unchanged rising edge of RDATA_ZERO_DLY and the delayed falling edge of RDATA_ONE_DLY. When CLK transitions from low to high, DFF 716 latches the complement of the output of DFF 716. The asynchronous set terminal (SB) and asynchronous reset terminal (RB) guarantee that the output signal RDATA is DC correct, i.e., DFF 716 outputs high RDATA in response to signals indicating a high level of DATA (e.g., RDATA_ONE_DLY being high and R_DATA_ZERO_DLY being low causes an asynchronous set) and DFF 716 outputs low RDATA in response to a signal indicating a low level of DATA (e.g., RDATA_ONE_DLY being low causes an asynchronous reset). As referred to herein, the output of a circuit is DC correct if the output has the correct DC state in the event of a power failure. For example, in the event of a power failure, transmitter circuit 602 stops transmitting and provides a '0' or other defined state. If receiver circuit 604 loses power, receiver circuit 604 provides a '0' or other defined state. Although receiver circuit 604 loses state information in response to the power failure, receiver circuit 604 quickly restores the correct output level upon power-up. In exemplary high-power applications, the delay in DC-correctness must be very fast (e.g., in tens to hundreds of nanoseconds) since power transistors may be damaged if configured in the wrong state for even a short period of time. Note that the logic of FIG. 9 is exemplary only and other combinations of logic devices and/or state elements may be used to generate RDATA based on RDATA_ONE and RDATA_ZERO.

FIGS. 11-14 illustrate another embodiment of a digital isolator system that reduces jitter on both the rising and falling edges of RDATA using expanded isolation channel 606 described above. Similar to transmitter circuit 602 described above, transmitter circuit 702 transmits DATA_ONE, which oscillates for the duration of DATA having a high value and is constant otherwise. However, unlike transmitter circuit 602, which transmits a representation of DATA_ZERO that oscillates for the duration of DATA having a low value, transmitter circuit 702 transmits a representation of DATA_ZERO that includes only a pulse of the carrier signal in response to DATA having a low value and is constant otherwise. Receiver circuit 704 uses circuit 614 to receive the associated differential signals and uses energy detection or other suitable techniques to generate RDATA_ONE and RDATA_ZERO.

Figure 13:
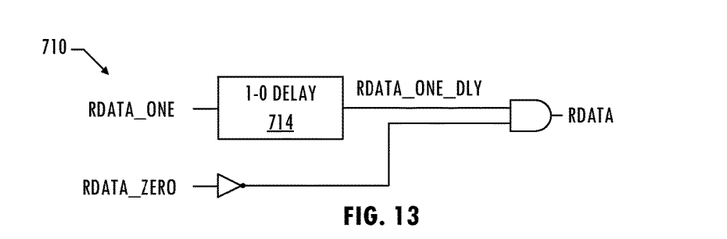
FIG. 13 illustrates a functional block diagram of a combiner of the low-jitter digital isolator system of FIG. 11 consistent with at least one embodiment of the invention.
Figure 14:
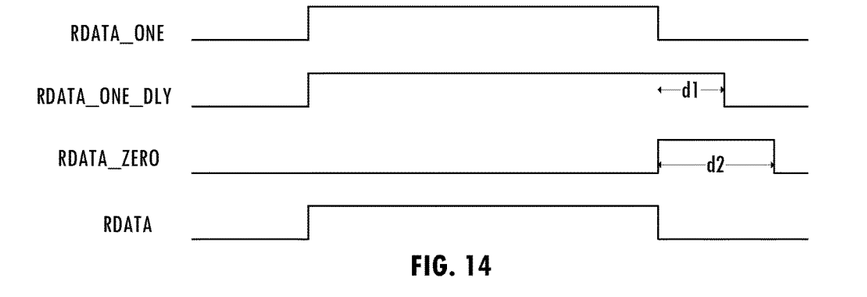
FIG. 14 illustrates waveforms for the combiner of FIG. 13 consistent with at least one embodiment of the invention.

Combiner 710 combines the signals received over the two separate channels to recover RDATA by generating a rising edge of RDATA using a rising edge of RDATA_ONE and generating a falling edge of RDATA using a rising edge of RDATA_ZERO. An exemplary combiner 710 is illustrated in FIGS. 13 and 14. Note that combiner 710 includes only falling edge delay element 714, which delays only one edge of the signal (i.e., falling edge) and simple logic gates to generate RDATA. Combiner 710 includes no state elements. Combiner 710 uses the rising edge of RDATA_ONE to generate the rising edge of RDATA and generates the falling edge of RDATA when RDATA_ZERO transitions high. Note that falling edge delay element 714 delays only one edge of the signal (e.g., falling edge) and introduces a delay, d1, that is less than the pulse width, d2, of RDATA_ZERO. Since the RDATA_ZERO is only needed for timing information, the oscillator of FIG. 11 used to generate DATA_ZERO is turned off after generating a pulse including that timing information. Timing of the DATA_ZERO indicates a low signal on DATA and when both DATA_ZERO and DATA_ONE are constant also indicates a low signal on DATA. By only generating a pulse of the carrier signal as DATA_ZERO, the reduced jitter digital isolator of FIGS. 11-14 consumes less power than the reduced jitter digital isolator of FIGS. 7-10.

Figure 15:
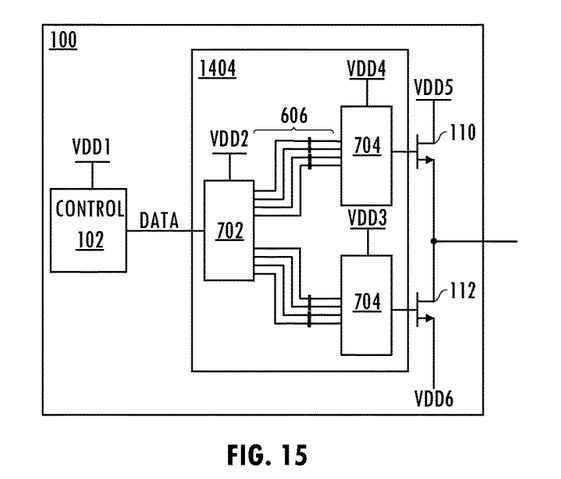
FIG. 15 illustrates a functional block diagram of a multi-chip module including a digital isolator system consistent with at least one embodiment of the invention.

Referring to FIG. 15, in an exemplary application, reduced jitter digital isolator 1404 includes transmitter circuit 702, expanded isolation channel 606, and receiver circuits 704. Other embodiments of digital isolator 1404 include one receiver circuit 704 or additional transmitter circuits 702 and additional receiver circuits 704. Transmitter circuit 702 and receiver circuits 704 include terminals that may be pins of corresponding packages included in a package of the multi-chip module. Those terminals may be coupled to external elements, e.g., transformers, discrete resistors, and discrete capacitors within the multi-chip module or to the terminals of the package of the multi-chip module. In other embodiments, transmitter circuit 702 is formed on a first integrated circuit die and receiver circuit 704 is formed on another integrated circuit die, both of which are attached to a lead frame and include terminals coupled to isolation channel 606 formed on the lead frame and packaged as a single device. In still other embodiments, transmitter circuit 702 and receiver circuit 704 include terminals coupled to isolation channel 606, all of which are formed on an integrated circuit die. Isolation channel 606 allows safe communication of signals from controller 102 to receiver circuits 704, which drive high-power drive devices 110 and 112 used to deliver power to a load system. Referring to FIGS. 1 and 15, note that the isolation channel required by reduced jitter digital isolator 1404 using techniques described above requires additional terminals for transmitter circuit 702 and receiver circuit 704, as compared to transmitter circuit 106 and receiver circuit 108 included in system 104. Note that the embodiments of reduced jitter digital isolator 1404 described above may alternatively include transmitter circuit 602 and receiver circuits 604 instead of transmitter circuit 702 and receiver circuits 704, respectively.

Figure 16:
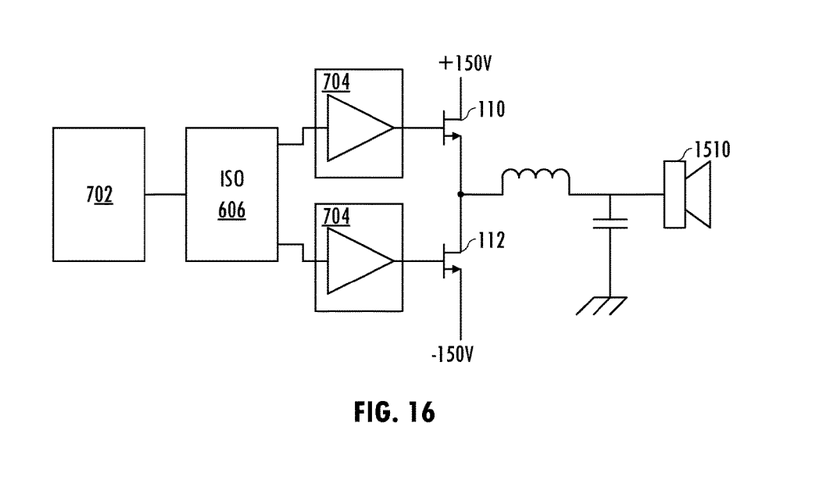
FIG. 16 illustrates a functional block diagram of a digital isolator system in an exemplary driver application.

Although reduced jitter digital isolators have been described with embodiments that are DC correct, which is required by some applications (e.g., class D audio application that drives a high-power speaker 1510, as illustrated in FIG. 16) other embodiments of reduced jitter digital isolators consistent with the techniques described herein use detection mechanisms that generate RDATA, but are not DC correct. In addition, RDATA_ONE and RDATA_ZERO may be generated with other polarities (e.g., oscillating when DATA is low and constant when DATA high. Furthermore, other embodiments of reduced jitter digital isolators consistent with the teachings herein, generate a DATA_ONE signal including only a pulse of the carrier signal in response to a rising edge of DATA and is constant otherwise, e.g., in systems that do not require DC-correctness or systems that otherwise ensure DC-correctness.

The description of the invention set forth herein is illustrative, and is not intended to limit the scope of the invention as set forth in the following claims. For example, while the invention has been described in embodiments in which capacitive isolation channels are used, one of skill in the art will appreciate that the teachings herein can be utilized with any isolation channel that has high-jitter data edge transitions or that has one data edge transition that is a greater source of jitter than the other data edge transition. In addition, while the invention has been described in embodiments in which differential signaling is used, one of skill in the art will appreciate that the teachings herein can be utilized with single-ended signaling. Variations and modifications of the embodiments disclosed herein, may be made based on the description set forth herein, without departing from the scope and spirit of the invention as set forth in the following claims.

What is claimed is:

1. A method of communicating using an isolation channel, the method comprising:
   generating a first received signal based on a representation of a first signal received using the isolation channel, the first signal oscillating in response to a data signal having a first signal level and the first signal being constant in response to the data signal having a second signal level;
   generating a second received signal received based on a representation of a second signal received using the isolation channel, the second signal oscillating in response to the data signal having the second signal level and the second signal being constant in response to the data signal having the first signal level; and
   generating a recovered data signal having a first transition in a first direction between the first and second levels based on an edge of the first received signal and having a second transition in a second direction between the first and second levels based on an edge of the second received signal.

2. The method, as recited in claim 1, further comprising:
   generating the first signal;
   generating the second signal; and
   transmitting the first and second signal using the isolation channel.

3. The method, as recited in claim 2, wherein generating the first signal comprises enabling a first oscillator for a duration of the data signal having the first signal level and generating the second signal comprises enabling a second oscillator for a duration of the data signal having the second signal level.

4. The method, as recited in claim 2, wherein generating the second signal comprises generating a pulse indicating the data signal having the second signal level and enabling a second oscillator for a duration of the pulse.

5. The method, as recited in claim 1, wherein the second signal oscillates for less than a duration of the data signal continuously having the second signal level and the second signal having a constant level otherwise.

6. The method, as recited in claim 1, wherein the recovered data signal is DC correct.

7. An apparatus for communicating using an isolation channel, the apparatus comprising:
- a transmitter circuit comprising:
  - a first terminal configured to communicate a first signal to the isolation channel, the first signal oscillating in response to a data signal having a first signal level and the first signal being constant in response to the data signal having a second signal level; and
  - a second terminal configured to communicate a second signal to the isolation channel, the second signal oscillating in response to the data signal having the second signal level and the second signal being constant in response to the data signal having the first signal level; and
- a receiver circuit configured to generate a first received signal based on a received representation of the first signal and configured to generate a second received signal based on a received representation of the second signal,
  - wherein the receiver circuit comprises a combiner circuit configured to generate a recovered data signal having a first transition in a first direction between the first and second signal levels based on an edge of the first received signal and having a second transition in a second direction between the first and second signal levels based on an edge of the second received signal.

8. The apparatus, as recited in claim 7, wherein the transmitter circuit further comprises:
- a first signal generator configured to receive the data signal as an enable signal and enable a first oscillator in response to the first signal level of the data signal and disable the first oscillator in response to the second signal level of the data signal to thereby generate the first signal; and
- a second signal generator configured to receive the data signal as a complementary enable signal and enable a second oscillator in response to the second signal level of the data signal and disable the second oscillator in response to the first signal level of the data signal to thereby generate the second signal,
- wherein the transmitter circuit is configured to transmit the first signal using the first terminal and configured to transmit the second signal using the second terminal.

9. The apparatus, as recited in claim 7, further comprising: the isolation channel responsive to the first signal and the second signal to supply corresponding representations of the first signal and the second signal across an isolation barrier of the isolation channel.

10. The apparatus, as recited in claim 7, wherein the first signal oscillates for a duration of the data signal having the first signal level and the second signal oscillates for a duration of the data signal having the second signal level.

11. The apparatus, as recited in claim 7, wherein the second signal oscillates for a duration of a pulse indicating the data signal having the second signal level, the duration of the pulse being less than a duration of the data signal having the second signal level.

12. The apparatus, as recited in claim 7, wherein the transmitter circuit further comprises:
- a first signal generator comprising a first oscillator circuit configured to generate the first signal; and
- a second signal generator configured to generate the second signal, the second signal generator comprising:
  - a one-shot signal generator configured to generate a pulse in response to the data signal transitioning from the first signal level to the second signal level; and
  - a second oscillator circuit configured to generate a pulse of a clock signal in response to the pulse, the second signal being generated based on the clock signal.

13. The apparatus, as recited in claim 7, wherein the data signal is received asynchronously.

14. The apparatus, as recited in claim 7, wherein the recovered data signal is DC correct.

15. An apparatus for communicating using an isolation channel, the apparatus comprising:
- a receiver circuit comprising:
  - a first terminal configured to receive from an isolation channel a representation of a first signal, the first signal oscillating in response to a data signal having a first signal level and the first signal being constant in response to the data signal having a second signal level, the receiver circuit being configured to generate a first received signal based on the representation of the first signal received from the first terminal; and
  - a second terminal configured to receive from the isolation channel a representation of a second signal, the second signal oscillating in response to the data signal having the second signal level and the second signal being constant in response to the data signal having the first signal level, the receiver circuit being configured to generate a second received signal based on the representation of the second signal received from the second terminal; and
  - a combiner circuit configured to generate a recovered data signal having a first transition in a first direction between the first and second signal levels based on an edge of the first received signal and having a second transition in a second direction between the first and second signal levels based on an edge of the second received signal.

16. The apparatus, as recited in claim 15, further comprising:
- the isolation channel responsive to the first signal and the second signal to supply corresponding representations of the first signal and the second signal across an isolation barrier.

17. The apparatus, as recited in claim 15, wherein the combiner circuit comprises:
- an edge delay circuit responsive to the first received signal having a delayed edge and an undelayed edge;
- an inverter circuit responsive to the second received signal; and
- a logic gate coupled to the edge delay circuit and the inverter circuit and configured to provide the recovered data signal having a first transition in a first direction between the first and second signal levels based on the undelayed edge of the first received signal and having a second transition in a second direction between the first and second signal levels based on an edge of the second received signal.

18. The apparatus, as recited in claim 15, wherein the combiner circuit comprises:
- a first edge delay circuit responsive to the first received signal to generate a first edge-delayed signal having a first delayed edge and a first undelayed edge;
- a second edge delay circuit responsive to the second received signal to generate a second edge-delayed signal having a second delayed edge and a second undelayed edge; and
- a state element coupled to receive one of the first and second edge-delayed signals on a data port, coupled to receive a signal based on the first and second edge-delayed signals on a clock port, and coupled to receive control signals on set and reset ports based on the first and second edge-delayed signals to thereby generate a recovered data signal having a first transition in a first direction between the first and second signal levels based on the first undelayed edge of the first received signal and having a second transition in a second direction between the first and second signal levels based on the second undelayed edge of the second received signal.

19. The apparatus, as recited in claim 15, wherein the recovered data signal is DC correct.

\* \* \* \* \*

UNITED STATES PATENT AND TRADEMARK OFFICE
CERTIFICATE OF CORRECTION

Page 1 of 1

PATENT NO. : 9,923,643 B2
APPLICATION NO. : 14/105332
DATED : March 20, 2018
INVENTOR(S) : Timothy J. Dupuis et al.

It is certified that error appears in the above-identified patent and that said Letters Patent is hereby corrected as shown below:

In the Claims

In Column 8, Line 42, please insert --signal-- before "levels".

Signed and Sealed this
Twenty-fourth Day of July, 2018

Andrei Iancu
*Director of the United States Patent and Trademark Office*